United States Patent Office 3,018,269
Patented Jan. 23, 1962

3,018,269
POLYMERIC COMPOSITIONS, SHAPED ARTICLES THEREFROM AND PROCESS OF PREPARATION
Michael Francis Bruno, Grand Island, N.Y., assignor to E. I. du Pont de Nemours and Company, Wilmington, Del., a corporation of Delaware
No Drawing. Filed July 29, 1960, Ser. No. 46,065
12 Claims. (Cl. 260—45.8)

This invention relates to organic polymeric structures and, particularly, to the preparation of polymeric compositions which can be formed into shaped articles such as polymeric films, filaments, tapes, ribbons, etc., that are suitable for outdoor use.

Many organic polymeric structures, such as structures of polyethylene, polypropylene, polyvinyl chloride and the like, deteriorate rapidly when subjected to sunlight. The materials are sensitive to light in the ultraviolet range, particularly in the wave length range of 2900–4000 A. Exposure to the ultraviolet light tends to embrittle the polymeric structures and reduce the level of their electrical and physical properties substantially. Some polymers acquire an undesirable color upon exposure to the ultraviolet light.

On the other hand, polymers such as polyvinyl fluoride are reasonably resistant to the degrading action of ultraviolet light and are capable of withstanding extended periods of exposure. However, this property of polyvinyl fluoride does not protect articles enclosed in a wrapping of the ultraviolet light-resistant polymer nor does this property protect substrates upon which these polymers may be placed. In certain instances, the degrading effect on materials enclosed or covered by polyvinyl fluoride and the like has been minimized by incorporating chemical compounds known as ultraviolet light absorbers in mechanical mixtures with the polyvinyl fluoride. These compounds may be either incorporated in the molten polymer prior to forming a structure or they may be coated on the surface of the polymeric shaped structure. In either case, the protection provided by the compounds is only temporary. When used as coatings on the surface of the polymeric structure, these compounds tend to be lost by mechanical abrasion. When used in the body of the polymer, they tend to exude gradually to the surface of the structure and then suffer the same fate as the coatings.

It is an object of this invention to provide novel polymeric compositions of high stability against deterioration due to exposure to ultraviolet light. It is another object to provide compositions capable of providing sustained protection against the transmission of ultraviolet light radiation. It is also an object to provide a process for preparing such compositions and to provide useful polymeric shaped structures from such compositions. Other objects will appear hereinafter.

The objects are accomplished by a polymeric composition comprising polyvinyl fluoride and a stabilizing amount of a triazole of the formula

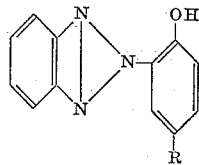

wherein R is an alkyl group having from 8 to 16 carbon atoms, at least two of said carbon atoms being tertiary carbon atoms.

The amount of the triazole employed in the compositions with polyvinyl fluoride may be varied widely, the stabilizing amount depending upon the particular use to which the polymeric composition is to be put. The triazole in concentrations of 0.05% to 10%, based on the weight of polyvinyl fluoride, is most generally used. However, concentrations of 0.5% to 1.5% are satisfactory for most important uses and are preferred.

PREPARATION OF THE TRIAZOLE

The triazoles may be prepared by first coupling an ortho-nitrobenzene diazonium compound with a substituted phenol and then reducing the ortho-nitro azo phenol. The substituted phenol has the critical substitution of an 8–16 carbon atom alkyl group, two carbon atoms being tertiary carbon atoms, in the para position. The ortho-nitrobenzene diazonium compound is prepared in the known manner by diazotizing ortho-nitroaniline with sodium nitrile and dilute hydrochloric acid. The substituted phenol may be prepared in accordance with the procedure described in British Patent No. 560,908 wherein phenol and the appropriate olefin are heated in the presence of a boric acid-oxalic acid catalyst system to form the alkylated phenol. The latter is isolated by distillation under reduced pressure.

Coupling is accomplished by reacting an alkaline salt of the substituted phenol with the ortho-nitrobenzene diazonium chloride to form the 2-(2-nitrophenylazo)-substituted phenol. This compound is reduced to the triazole by refluxing in the presence of zinc.

Among the triazoles falling within the definition of useful stabilizers for the present invention, there are several which are preferred. Thus, it has been found that the best results have been obtained by using with the polyvinyl fluoride film stabilizing amounts of 2-[2'-hydroxy-5'-(1,1,3,3-tetramethylbutyl) - phenyl]-2,1,3-benzotriazole and 2-[2'-hydroxy-5'-(1,1,3,3,5,5-hexamethylhexyl)-phenyl]-2,1,3-benzotriazole.

PREPARATION OF POLYVINYL FLUORIDE FILM CONTAINING THE TRIAZOLE

The polyvinyl fluoride film containing the stabilizing amount of triazole is then prepared by using a latent solvent in accordance with the dispersion-coalescence method. A preferred process is that described and claimed in the copending application Serial No. 715,394, filed by L. R. Bartron on February 14, 1958, and assigned to the assignee of the present application. According to this process, a suitably proportioned mixture of particles of high molecular weight, orientable polyvinyl fluoride, the triazole and the latent solvent are heated until the particles coalesce to form a single-phase fluid composition. The fluid composition is then extruded as a triazole-containing polyvinyl fluoride film.

U.S. Patent Nos. 2,419,008 and 2,419,010 to Coffman et al. and U.S. Patent No. 2,423,749 to Austin relate to the preparation of orientable polyvinyl fluoride and disclose the formation of solvent-free films by casting hot solutions containing small amounts of polymer. Latent solvent-containing films having a stabilizing amount of triazole incorporated in them could be made by casting films from solutions of this type and then volatilizing only a portion of the solvent originally present.

Latent solvent-containing self-supporting films of orientable polyvinyl fluoride containing triazole may also be prepared by spreading a polymer/triazole/latent solvent mixture on a smooth, flat nonadherent surface such as a plate, an endless belt, a drum or the like and subjecting the mixture to a temperature high enough to cause the polymer particles to coalesce. The resulting gel film containing the triazole can then be quenched by immersion in cold water or by spraying the gel film on the plate or the like with cold water. After the quenching step, the film is stripped from the smooth surface.

Specifically, an organosol is first prepared containing a stabilizing amount of the triazole (0.05%–10% based on the weight of polyvinyl fluoride) and polyvinyl fluoride in a latent solvent, the polyvinyl fluoride representing 10%–85% by weight of the "solution." Next, the organosol is heated to an elevated temperature that is effective to completely coagulate the polymer particles and convert the mixture into a fluid, single-phase composition. Then, the fluid composition is formed into a shaped article. To form a self-supporting film, the composition is extruded at an elevated temperature below the normal boiling point of the latent solvent. In general, this temperature lies between 120° C. and 220° C. Finally, the shaped article is cooled quickly to a temperature below 100° C., preferably in a water quench bath at room temperature or below.

The term "latent solvent," as used herein, is meant to include an organic liquid having a normal boiling point above 100° C., having no significant solvent or swelling action on polyvinyl fluoride at room temperature, but having a solvent action on polyvinyl fluoride sufficient to cause particles of this polymer to coalesce at an elevated temperature below its normal boiling point. The most useful latent solvent for the purpose of the present invention is gamma-butyrolactone. However, any of the known latent solvents for polyvinyl fluoride may be used. The following list, although not exhaustive, contains examples of useful latent solvents for the present process:

Butadiene cyclic sulfone, tetramethylenesulfone, dimethylsulfolane, hexamethylenesulfone, diallylsulfoxide, dimethylsulfoxide, dicyanobutene, adiponitrile, ethylene carbonate, propylene carbonate, 1,2 butylene carbonate, 2,3-butylene carbonate, isobutylene carbonate, trimethylene carbonate, N,N-diethylformamide, N N-dimethylacetamide, acetamide, N,N-dimethylformamide, N,N-dimethyl-gamma-hydroxyacetamide, N,N - dimethyl-gamma-hydroxybutyramide, N,N - dimethylactamide, N,N - dimethylmethoxyacetamide, N - methylacetamide, N - methylformamide, N,N - dimethylaniline, N,N - dimethylethanolamine, 2 - piperidone, N - methyl - 2 - piperidone, N - methyl - 2 - pyrrolidone, N - ethyl - 2 - pyrrolidone, N-isopropyl - 2 - pyrrolidone, 5 - methyl - 2 - pyrrolidone, beta - propiolactone, delta-valerolactone, gamma - valerolactone, alpha - angelicalactone, beta - angelicalactone, epsilon - caprolactone, and alpha, beta and gamma-substituted alkyl derivatives of gamma-butyrolactone, gamma-valerolactone and delta-valerolactone, as well as delta-substituted alkyl derivatives of delta-valerolactone, tetramethyl urea, 1-nitropropane, 2-nitropropane, acetonyl acetone, acetophenone, acetyl acetone, cyclohexanone, diacetone alcohol, dibutyl ketone, isophorone, mesityl oxide, methylamyl ketone, 3-methylcyclohexanone, bis - (methoxymethyl)uron, methylacetylsalicylate, diethyl phosphate, dimethyl phthalate, ethyl acetoacetate, methyl benzoate, methylene diacetate, methyl salicylate, phenyl acetate, triethyl phosphate, tris (morpholino) phosphine oxide, N-acetylmorpholine, N-acetylpiperidine, isoquinoline, quinoline, pyridine and tris(dimethylamido) phosphate.

In order to produce shaped structures of polyvinyl fluoride having useful property levels, it is necessary to select the polymer carefully. Specifically, the polymer must have an inherent viscosity of at least 1 and for the production of self-supporting films, the polymer should have an inherent viscosity of at least 1.5, preferably between 3.5 and 4.0. Polyvinyl fluoride having an inherent viscosity in the preferred range can be extruded relatively easily at temperatures low enough to avoid thermal degradation and at a reasonable rate to provide a finished, solvent-free film having a superior property level.

The invention will be more clearly understood by referring to the examples which follow, Example 1 representing the best mode contemplated for practicing the invention. It is understood that the examples, although illustrating specific embodiments, should not be considered limitative. In general, the examples include a description of the preparation of the ortho-nitro azo phenol, the reduction of the phenol to the triazole and the preparation of the polyvinyl fluoride film containing the triazole.

*Example 1*

To a stirred mixture of 69 grams (0.5 mole) of o-nitroaniline in 500 grams of 20% hydrochloric acid at 0° C. was added 138 grms (2.0 moles) of sodium nitrite in 125 ml. of water. The resulting solution of o-nitrobenzene diazonium chloride was stirred at 0° C.–10° C. for one hour. A cold slurry of potassium p-(1,1,3,3-tetramethylbutyl)-phenolate, prepared by removing the methanol by distillation from a solution of 103 grams (0.5 mole) of p-(1,1,3,3-tetramethylbutyl)-phenol, 28 grams (0.5 mole) of potassium hydroxide, 200 ml. of methanol and 500 ml. of water, was added slowly to the o-nitrobenzene diazonium chloride solution. The reaction mixture was stirred at room temperature for 15 hours and then was extracted twice with ether. The ether solution was dried and evaporated to give 155 grams of a red-brown semi-solid. Recrystallization of this product from an alcohol-water solution gave red needles with a melting point of 114.4° C.–114.8° C. The following analysis proved the presence of 2-(2-nitrophenylazo) - 4 - (1,1,3,3 - tetramethylbutyl) - phenol.

*Analysis.*—Calculated for $C_{20}H_{25}O_3N_3$: C, 67.58; H, 7.09; N, 11.82. Found: C, 67.22; H, 7.11; N, 11.46.

Ten grams (0.028 mole) of 2-(2-nitrophenylazo)-4-(1,1,3,3-tetramethylbutyl)-phenol was dissolved in a solution of 27 grams (0.67 mole) of sodium hydroxide, 400 ml. of methanol and 500 ml. of water and warmed to 60° C. The solution was stirred and, while stirring, 12.16 grams (0.186 mole) of zinc dust was added over a one-hour period. The resulting green mixture was heated under reflux for 12 hours. The methanol was then removed by distillation and the reaction mixture was cooled and filtered with suction. The gray precipitate was warmed on a steam bath for 0.5 hour with 20% hydrochloric acid in order to destroy any unreacted zinc and to decompose the zinc chelate. The acid solution was cooled and filtered to give 6.9 grams (77%) of a brown solid with a melting point of 100° C.–104° C. Recrystallization of this product from an alcohol-water solution gave the desired product, the triazole, a group of slightly yellow, felt-like needles having a melting point of 103.8° C.–104° C., proved by the following analysis:

*Analysis.*—Calculated $C_{20}H_{25}N_3O$: C, 74.27; H, 7.79; N, 12.99. Found: C, 74.40; H, 7.75; N, 12.98.

An organosol was prepared containing 1% by weight of the triazole, based on the weight of polymer, in a 40% solids mixture of polyvinyl fluoride in gamma-butyrolactone. The organosol was shaped into a film following the procedure described in copending application, U.S. Serial No. 715,394 and described in column 2 of this specification. The coalesced film was then dried at 150° C. for 5 minutes, quenched in water at 25° C. and, thereafter, was again dried at 150° C. for 15 minutes.

The resulting 2-mil film was shown to be a very effective screen for ultraviolet light. It transmitted only 3% of incident ultraviolet light of 3380 A.

As a control, 2-(2'-hydroxy-5'-methylphenyl)-2,1,3-benzotriazole, a compound similar in structure to that shown above but which did not contain the highly branched chain attached to the phenyl group, was incorporated in a polyvinyl fluoride film by the same procedure as described above. Incident ultraviolet light was transmitted through the resulting film with essentially no diminution. It was found that essentially all of the stabilizer incorporated in the organosol was lost from the resulting film structure during the process of film formation.

*Example 2*

Following the procedure of Example 1, 2-(2-nitrophenylazo)-4-(1,1,3,3,5,5-hexamethylhexyl) - phenol was prepared by reacting at 0° C.–10° C. a mixture of 69 grams of o-nitroaniline in 500 grams of 20% hydrochloric acid and 138 grams of sodium nitrite in 125 ml. of water with a cold slurry of potassium p-(1,1,3,3,5,5-hexamethylhexyl)-phenolate, made by removing methanol from a solution of 131 grams of p-(1,1,3,3,5,5-hexamethylhexyl)-phenol, 28 grams of potassium hydroxide, 200 ml. of methanol and 500 ml. of water. The reaction mixture of oxalic acid. The desired alkylated phenols were isolated by distillation under reduced pressure. Conversion of the alkylated phenol to the nitrophenylazo derivative and finally to the benzotriazole was as illustrated in Example 1.

The table summarizes the starting olefin, the resulting phenol after reaction with the olefin and the ultimate triazole used to the extent of 1% in a polyvinyl fluoride film:

TABLE

| Ex. | Triazole | Phenol | Olefin |
|---|---|---|---|
| 3 | 2 - [2' - hydroxy - 5' - (1,1,4,4 - tetramethylpentyl)-phenyl]-2,1,3-benzotriazole | p-(1,1,4,4-tetramethylpentyl)phenol | 2,5,5-trimethylhexene-2. |
| 4 | 2 - [2' - hydroxy - 5' - (1 - methyl - 1 - n - propyl - 2,2 - dimethylpropyl)-phenyl]-2,1,3-benzotriazole | p - (1 - methyl - 1 - n - propyl - 2,2 - dimethylpropyl)phenol | 2,2,3-trimethylhexene-3. |
| 5 | 2 - [2' - hydroxy - 5' - (1,1 - diethyl - 2,2 - dimethylpropyl)phenyl]-2,1,3-benzotriazole | p - (1,1 - diethyl - 2,2 - dimethylpropyl) - phenol | 4,4-dimethyl-3-ethylpentene-2. |
| 6 | 2 - [2' - hydroxy - 5' - (2,2,3,3,4 - pentamethylbutyl) - phenyl]-2,1,3-benzotriazole | p - (2,2,3,3,4-pentamethylbutyl)phenol | 2,3,3,4-tetramethylpentene-1. |
| 7 | 2[2' - hydroxy - 5' - (2 - isopropyl - 2,3,3 - trimethylpropyl)phenyl]-2,1,3-benzotriazole | p - (2 - isopropyl - 2,3,3 - trimethylpropyl) - phenol | 3,3-dimethyl-2-isopropyl-butene-1. |
| 8 | 2[2' - hydroxy - 5' - (1 - ethyl - 1,3,3 - trimethylpentyl)-phenyl]-2,1,3-benzotriazole | p - (1 - ethyl - 1,3,3 - trimethylpentyl) - phenol | 3,5,5-trimethylheptene-2. |
| 9 | 2[2' - hydroxy - 5' - (1 - tertiarybutyl - 1,2,2 - trimethylpropyl)phenyl]-2,1,3-benzotriazole | p - (1 - tertiarybutyl - 1,2,2 - trimethylpropyl)phenol | 3,3-dimethyl-2-tertiarybutyl-butene-1. |
| 10 | 2[2' - hydroxy - 5' - (1 - isopropyl - 1,2,2 - trimethylpentyl)phenyl]-2,1,3-benzotriazole | p - (1-isopropyl - 1,2,2 - trimethylpentyl) - phenol | 3,3-dimethyl-2-isopropylhexene-1. |
| 11 | 2[2' - hydroxy - 5' - (1 - tertiarybutyl - 1,2,2 - trimethylbutyl)phenyl]-2,1,3-benzotriazole | p - (1 - tertiarybutyl - 1,2,2 - trimethyl - butyl)phenol | 3,3-dimethyl-2-tertiarybutyl-pentene-1. |
| 12 | 2[2' - hydroxy - 5' - (1 - tertiarybutyl - 1,2,2 - trimethylpentyl)phenyl]-2,1,3-benzotriazole | p - (1 - tertiarybutyl - 1,2,2 - trimethyl - pentyl)phenol | 3,3-dimethyl-2-tertiarybutyl-hexene-1. |
| 13 | 2[2' - hydroxy - 5' - (1 - tertiarypentyl - 1,2,2 - trimethylbutyl)phenyl]-2,1,3-benzotriazole | p - (1 - tertiarypentyl - 1,2,2 - trimethyl - butyl)phenol | 3,3-dimethyl-2-tertiarypentyl-pentene-1. |
| 14 | 2[2' - hydroxy - 5' - (1,2 - dimethyl - 2 - ethyl - 1 - secondarybutylbutyl)phenyl]-2,1,3-benzotriazole | p - (1,2 - dimethyl - 2 - ethyl - 1 - secondary - butylbutyl)phenol | 3 - methyl - 3 - ethyl - 2 - secondarybutyl - pentene-1. |
| 15 | 2[2' - hydroxy - 5' - (1,2 - dimethyl - 2 - ethyl - 1 - tertiarybutylbutyl)phenyl]-2,1,3-benzotriazole | p - (1,2 - dimethyl - 2 - ethyl - 1 - tertiary - butylbutyl)phenol | 3 - methyl - 3 - ethyl - 2 - tertiarybutyl - pentene-1. |
| 16 | 2[2' - hydroxy - 5' - (1,2,2,3 - tetramethyl - 1 - tertiary - butylbutyl)phenyl]-2,1,3-benzotriazole | p - (1,2,2,3 - tetramethyl - 1 - tertiarybutyl - butyl)phenol | 3,3,4 - trimethyl - 2 - tertiarybutyl - pentene-1. |
| 17 | 2[2' - hydroxy - 5' - (1 - methyl - 2 - propyl - 1 - tertiary - butylpentyl)phenyl]-2,1,3-benzotriazole | p - (1 - methyl - 2 - propyl - 1 - tertiary - butylpentyl)phenol | 3-propyl-2-tertiarybutylhexene-1. |
| 18 | 2[2' - hydroxy - 5' - (1,2,2 - trimethyl - 1 - [1,1 - dimethylbutyl]pentyl)phenyl]-2,1,3-benzotriazole | p - (1,2,2 - trimethyl - 1 - [1,1 - dimethyl - butyl]pentyl)phenol | 3,3 - dimethyl - 2 - (1,1 - dimethylbutyl) - hexene-1. |
| 19 | 2[2' - hydroxy - 5' - (1,2,2,3,4,4,5,6 - octamethylheptyl) - phenyl]-2,1,3-benzotriazole | p - (1,2,2,3,4,4,5,6 - octamethylheptyl) - phenol | 3,3,4,5,5,6,7-heptamethyl-octene-1. |
| 20 | 2[2' - hydroxy - 5' - (1,1,3,3,5,5,7,7 - octamethyloctyl) - phenyl]-2,1,3-benzotriazole | p - (1,1,3,3,5,5,7,7 - octamethyloctyl) - phenol | 2,4,4,6,6,8,8-heptamethyl-nonene-1. | was stirred at room temperature for 15 hours and extracted with ether. The ether extract was evaporated and the residual semi-solid was recrystallized from an alcohol-water solution.

A solution of 11.5 grams of the resulting 2-(2-nitrophenylazo)-4-(1,1,3,3,5,5-hexamethylhexyl)-phenol dissolved in 27 grams of sodium hydroxide, 400 ml. of methanol and 500 ml. of water and warmed to 60° C. was reacted over a period of one hour with 12.2 grams of zinc dust. The reaction product, the triazole, was isolated as in the preceding example.

An organosol containing 1% by weight of the above-identified triazole in a 40% solids mixture of polyvinyl fluoride in gamma-butyrolactone was shaped into a film. The coalesced film was dried at 150° C. for five minutes, quenched in water at 25° C. and, thereafter, dried again at 150° C. for 15 minutes.

The resulting film transmitted 2% of incident ultraviolet light at 3380 A. The same film without the triazole ultraviolet light absorber transmitted the major portion of incident ultraviolet light.

*Examples 3–20*

Following the procedure described in Example 1, the triazoles shown in the following table were incorporated in polyvinyl fluoride. The resulting films showed essentially the same diminution in transmission of ultraviolet light as illustrated in Examples 1 and 2, i.e. between 97 and 98%.

The required substituted phenols were made in accordance with the procedure outlined in British Patent No. 560,908. Molar quantities of phenol and the olefin were heated for 15 minutes to 25 minutes with a catalyst system consisting of 0.45 gram of boric acid and 3.2 grams The main advantage of using the benzotriazoles as in this invention is that the alkylated benzotriazoles are not lost by evaporation or diffusion during processing nor during the step of forming the polymeric composition into a film. Thus, the quantity originally impregnated into the polymeric mass before film-forming is retained essentially in its entirety in the final finished film and a relatively high level of the benzotriazole is provided in the final product. The resulting product has improved resistance to degradation by ultraviolet light, effective screening action to prevent transmission of ultraviolet light through the polymeric structure and it does not become discolored even on prolonged exposure.

Having fully disclosed the invention, what is claimed is:
1. A composition of matter comprising polyvinyl fluoride and a stabilizing amount of a triazole of the formula

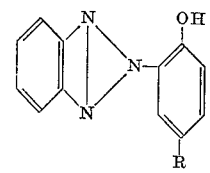

wherein R is an alkyl group having from 8 to 16 carbon atoms, at least two of said carbon atoms being tertiary carbon atoms.

2. A composition of matter as in claim 1 wherein the triazole is 2-[2'-hydroxy-5'-(1,1,3,3-tetramethylbutyl)-phenyl]-2,1,3-benzotriazole.

3. A composition of matter as in claim 1 wherein the triazole is 2-[2'-hydroxy-5'-(1,1,3,3,5,5-hexamethylhexyl)-phenyl]-2,1,3-benzotriazole.

4. A composition of matter comprising polyvinyl fluoride and 0.05%–10%, based on the weight of polyvinyl fluoride, of a triazole of the formula

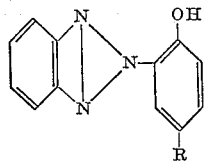

wherein R is an alkyl group having from 8 to 16 carbon atoms, at least two of said carbon atoms being tertiary carbon atoms.

5. A shaped article comprising polyvinyl fluoride and 0.05%–10%, based on the weight of polyvinyl fluoride, of a triazole of the formula

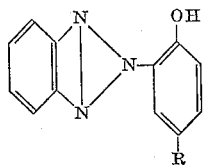

wherein R is an alkyl group having from 8 to 16 carbon atoms, at least two of said carbon atoms being tertiary carbon atoms.

6. A self-supporting film comprising polyvinyl fluoride and 0.05%–10%, based on the weight of polyvinyl fluoride, of a triazole of the formula

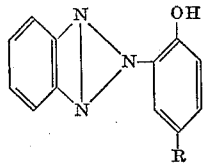

wherein R is an alkyl group having from 8 to 16 carbon atoms, at least two of said carbon atoms being tertiary carbon atoms.

7. A filament comprising polyvinyl fluoride and 0.05%–10%, based on the weight of polyvinyl fluoride, of a triazole of the formula

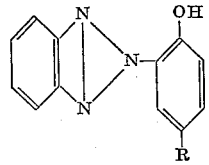

wherein R is an alkyl group having from 8 to 16 carbon atoms, at least two of said carbon atoms being tertiary carbon atoms.

8. A process comprising the steps, in sequence, of preparing an organosol of polyvinyl fluoride and 0.05%–10%, based on the weight of polyvinyl fluoride, of a triazole having the formula

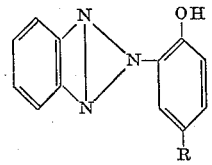

wherein R is an alkyl group having from 8 to 16 carbon atoms, at least two of said carbon atoms being tertiary carbon atoms, in a latent solvent, said polyvinyl fluoride representing 10%–85% by weight of said organosol; heating said organosol for a time sufficient to convert said organosol into a fluid, single-phase composition; forming said fluid composition into a shaped article; and cooling said shaped article to room temperature to separate the latent solvent from said article.

9. A process as in claim 8 wherein said latent solvent is gamma-butyrolactone.

10. A process as in claim 8 wherein said triazole is 2 - [2′ - hydroxy - 5′ - (1,1,3,3 - tetramethylbutyl) - phenyl]-2,1,3-benzotriazole.

11. A process as in claim 8 wherein said triazole is 2 - [2′ - hydroxy - 5′ - (1,1,3,3,5,5 - hexamethylhexyl)-phenyl]-2,1,3-benzotriazole.

12. A process comprising the steps, in sequence, of preparing an organosol of polyvinyl fluoride and 0.05%–10%, based on the weight of polyvinyl fluoride, of a triazole having the formula

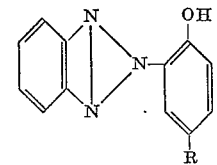

wherein R is an alkyl group having from 8 to 16 carbon atoms, at least two of said carbon atoms being tertiary carbon atoms, in gamma-butyrolactone, said polyvinyl fluoride representing 10%–85% by weight of said organosol; heating said organosol to a temperature between 120° C. and 220° C. for a time sufficient to convert said organosol into a fluid, single-phase composition; extruding said fluid composition in the form of a film at an elevated temperature below the normal boiling point of said gamma-butyrolactone; and quenching said film in a water bath at room temperature to separate the film from said gamma-butyrolactone.

No references cited.

UNITED STATES PATENT OFFICE
CERTIFICATE OF CORRECTION

Patent No. 3,018,269　　　　　　　　　　　　　　January 23, 1962

Michael Francis Bruno

It is hereby certified that error appears in the above numbered patent requiring correction and that the said Letters Patent should read as corrected below.

Column 2, line 16, for "nitrile" read -- nitrite --;
column 4, line 61, for "of", second occurrence, read -- at --.

Signed and sealed this 20th day of November 1962.

(SEAL)
Attest:

ERNEST W. SWIDER
Attesting Officer

DAVID L. LADD
Commissioner of Patents